US010634276B2

(12) United States Patent
Huang

(10) Patent No.: US 10,634,276 B2
(45) Date of Patent: Apr. 28, 2020

(54) MOUNTING APPARATUS AND ELECTRONIC DEVICE USING THE SAME

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Fu-Kuo Huang, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 23 days.

(21) Appl. No.: 16/018,185

(22) Filed: Jun. 26, 2018

(65) Prior Publication Data

US 2019/0242519 A1 Aug. 8, 2019

(30) Foreign Application Priority Data

Feb. 7, 2018 (CN) .......................... 2018 1 0127445

(51) Int. Cl.
*F16M 11/00* (2006.01)
*F16M 11/06* (2006.01)
*F16M 13/02* (2006.01)
(52) U.S. Cl.
CPC ............ *F16M 11/06* (2013.01); *F16M 13/02* (2013.01); *F16M 2200/04* (2013.01)

(58) Field of Classification Search
CPC ............. Y10S 248/917; Y10S 248/919; G06F 1/1601; G06F 1/1637
USPC ......... 248/125.1, 125.2, 157, 917, 919, 920, 248/924
See application file for complete search history.

(56) References Cited

U.S. PATENT DOCUMENTS

| 7,681,845 | B1 * | 3/2010 | Chang | F16M 11/105 |
| | | | | 248/161 |
| 8,056,877 | B2 * | 11/2011 | Wang | F16M 11/10 |
| | | | | 248/157 |
| 8,226,054 | B2 * | 7/2012 | Chen | F16M 11/10 |
| | | | | 16/337 |
| 9,310,841 | B2 * | 4/2016 | Williams | G06F 1/1632 |
| 10,190,725 | B2 * | 1/2019 | Aoyagi | F16M 11/22 |
| 10,317,006 | B2 * | 6/2019 | Kozlowski, Jr. | F16M 11/10 |

* cited by examiner

*Primary Examiner* — Steven M Marsh
(74) *Attorney, Agent, or Firm* — ScienBiziP, P.C.

(57) ABSTRACT

A mounting apparatus for mounting a display or other unit and providing assisted motion when adjusting the height of the display is included in an electronic device. The mounting apparatus includes first frame, pushing member, and slidable connecting unit. The connecting unit includes a second frame and a rotatable pivot pin corresponding to the pushing member. When the connecting unit is moved along a predetermined adjusting direction, the first elastic member restores, and the rotating pivot pin deforms the second elastic member. The connecting unit stops at a position, itself adjustable, where respective restoring forces of the first elastic member and the second elastic member are balanced.

18 Claims, 3 Drawing Sheets

MOUNTING APPARATUS AND ELECTRONIC DEVICE USING THE SAME

FIELD

The subject matter herein generally relates to mounting apparatus.

BACKGROUND

Display devices, such as flat panel displays and electronic white boards can be moved up and down by hand to adjust the display to a proper height. However, the display is often too heavy to be moved or to be stopped. It is necessary to develop an operator-friendly mounting apparatus.

BRIEF DESCRIPTION OF THE DRAWINGS

Implementations of the present disclosure will now be described, by way of example only, with reference to the attached figures.

DETAILED DESCRIPTION

Figure 1:
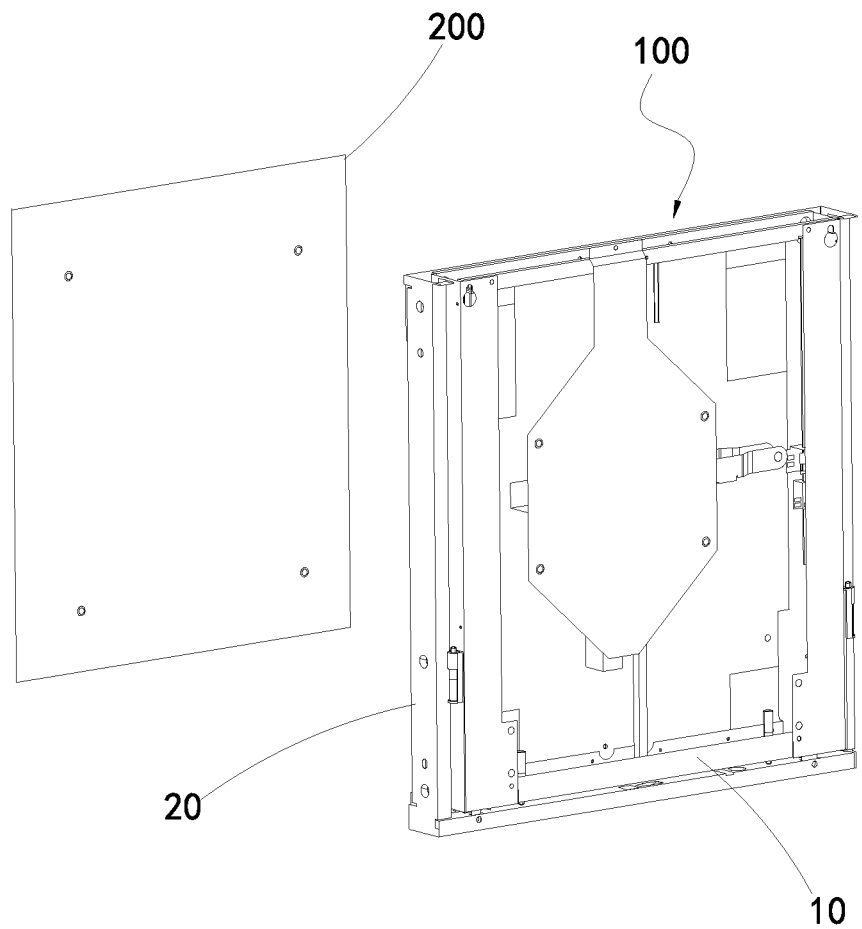
FIG. 1 illustrates an isometric view of an exemplary embodiment of an electronic display device.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

Several definitions that apply throughout this disclosure will now be presented.

The term "comprising" means "including, but not necessarily limited to"; it specifically indicates open-ended inclusion or membership in a so-described combination, group, series, and the like.

FIG. 1 illustrates an electronic device 500. The electronic device 500 includes a function unit 200 and a mounting apparatus 100, The function unit 200 is mounted in the mounting apparatus 100 for adjustability of the height of the function unit 200.

For example, the function unit 200 can be a flat panel display or an electronic white board.

Figure 2:
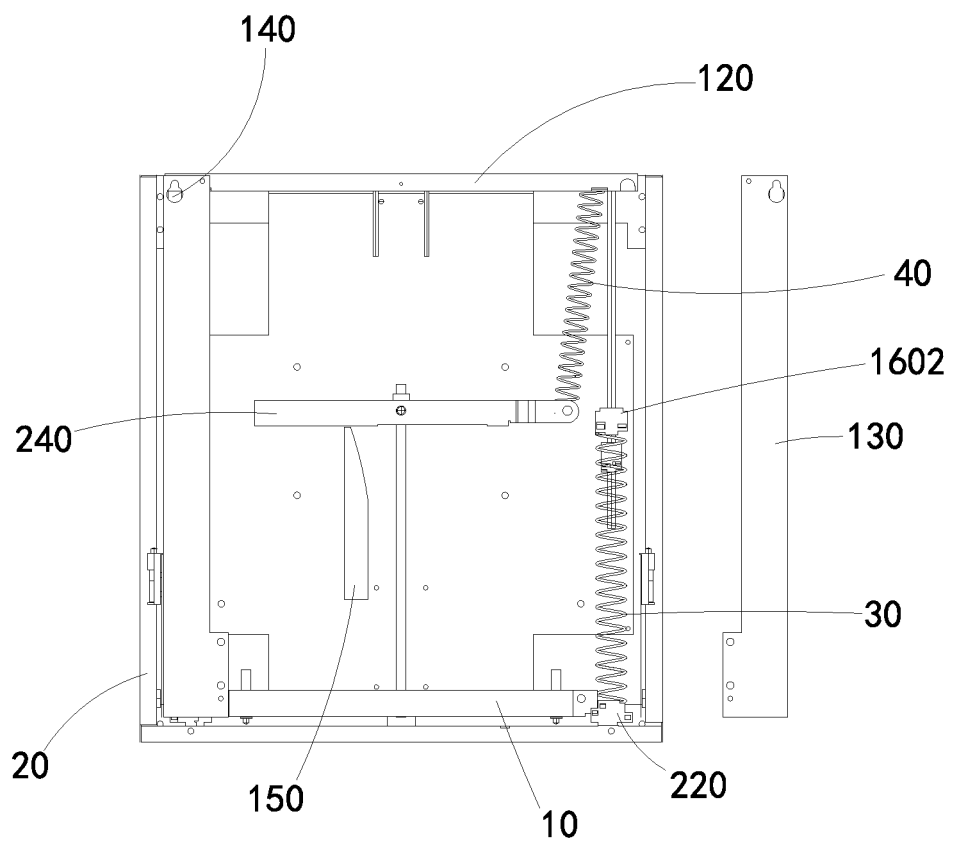
FIG. 2 illustrates an isometric view of the mounting apparatus of the device of FIG. 1.
Figure 3:
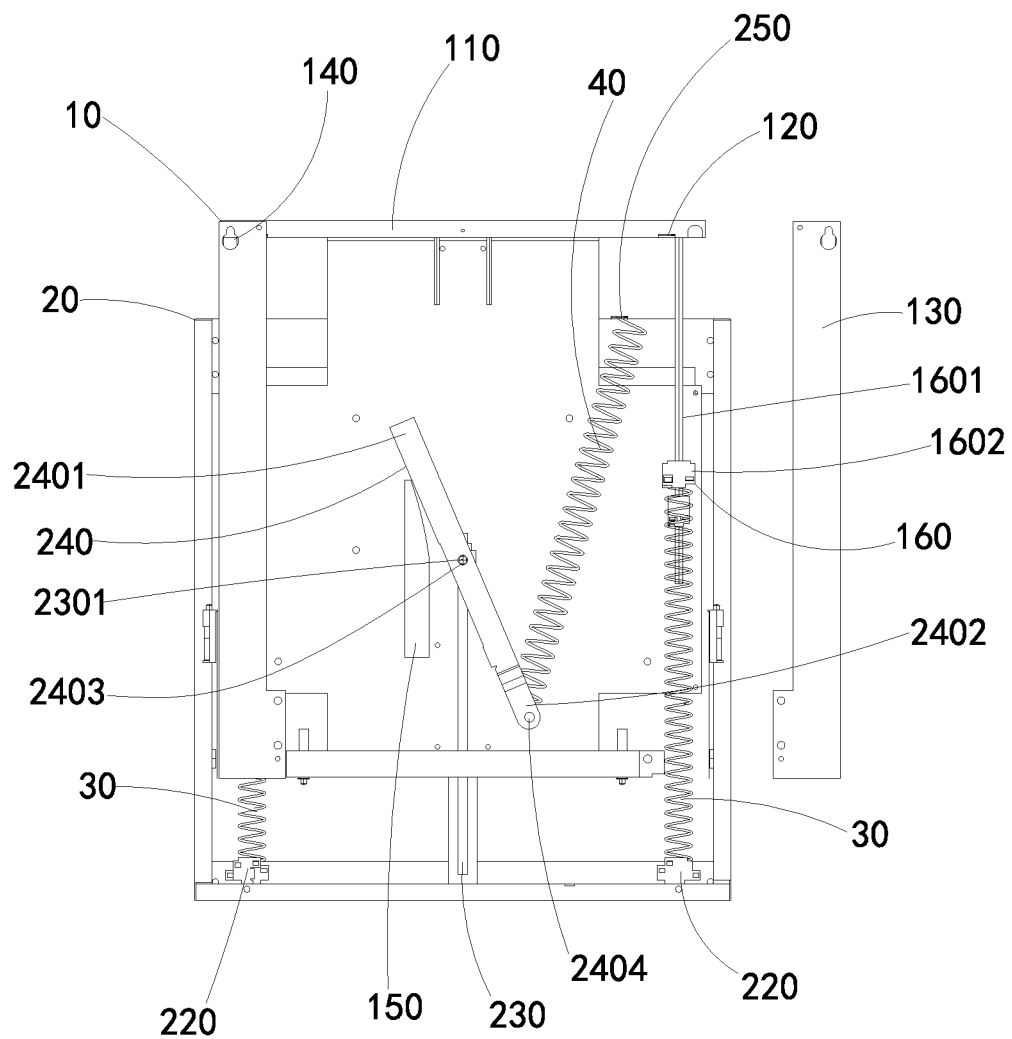
FIG. 3 illustrates another isometric view of mounting apparatus of the device of FIG. 1.

Referring also to FIGS. 2-4, the mounting apparatus 100 includes a mounting unit 10, a connecting unit 20, a first elastic member 30 and a second elastic member 40.

The mounting unit 10 allows fixing to an external surface. For example, the mounting unit 10 can be fixed to a wall.

The mounting unit 10 includes a first frame 110 and a pushing member 150. The pushing member 150 is fixed to the first frame 110.

The connecting unit 20 is slidably mounted to the mounting unit 10 and used to fix the function unit 200.

The connecting unit 20 includes a second frame 210 and a pivot pin 240 rotatably connected to the second frame 210, and the pivot pin 240 is corresponding to the pushing member 150.

The first elastic member 30 is connected between the mounting unit 10 and the connecting unit 20.

The second elastic member 40 is connected between the second frame 210 and an end of the pivot pin 240.

When the connecting unit 20 is moved along a predetermined adjusting direction, the first elastic member 30 is elastically deformed. The pushing member 150 drives the pivot pin 240 to rotate and the second elastic member 40 is elastically deformed when driven by the pivot pin 240. The connecting unit 20 stops at a predetermined position when respective restoring forces of the first elastic member 30 and the second elastic member 40 are balanced.

The second frame 210 defines a first fixing portion 250, an end of the pivot pin 240 defines a fixing hole 2404. The second elastic member 40 includes opposing ends connected to the first fixing portion 250 and the fixing hole 2404.

The connecting unit 20 further includes a connecting rod 230. The connecting rod 230 includes opposing ends. One end of the connecting rod 230 is connected to the second frame 210, the other end of the connecting rod 230 defines a pivot portion 2301. A middle portion of the pivot pin 240 defines a pivot hole 2403 corresponding to the pivot portion 2301.

The pivot pin 240 is rotatably connected to the connecting rod 230 through the pivot hole 2403 and the pivot portion 2301.

The pivot pin 240 can include a first end 2401 and a second end 2402 opposite to the first end 2401.

The fixing hole 2404 is defined on the second end 2402. The first end 2401 is corresponding to the pushing member 150. When the connecting unit 20 is moved along the predetermined adjusting direction, the pushing member 150 pushes the first end 2401 to drive the pivot pin 240 to rotate, the second end 2402 is thus driven to rotate and drives the second elastic member 40 to be elastically deformed.

The first frame 110 can include a top plate 120, a bottom plate (not labeled) parallel and adjacent to the top plate 120 and a side plate 130 connected between the top plate 120 and the bottom plate.

An end of the first elastic member 30 can be connected to the top plate 120, the other end of the first elastic member 30 can be connected to the second frame 210.

The top plate 120 can include a fixing member 160. An end of the first elastic member 30 is connected to the fixing member 160, the other end of the first elastic member 30 is connected to lower portion the second frame 210.

The fixing member can include a fixing pole 1601 and a second fixing portion 1602.

An end of the fixing pole 1601 is connected to the top plate 120, and the second fixing portion 1602 is fixed to the other end of the fixing pole 1601.

A lower portion of the second frame 210 defines a third fixing portion 220 corresponding to the second fixing portion 1602. An end of the first elastic member 30 is connected to the second fixing portion 1602, the other end of the first elastic member 30 is connected to the third fixing portion 220.

The mounting apparatus can include two first elastic members 30 symmetrically disposed.

The first frame 110 defines a mounting hole 140, the mounting unit 10 is fixed to an external portion through the mounting hole 140.

The embodiments shown and described above are only examples. Even though numerous characteristics and advantages of the present technology have been set forth in the foregoing description, together with details of the structure and function of the present disclosure, the disclosure is illustrative only, and changes may be made in the details, including matters of shape, size, and arrangement of the parts within the principles of the present disclosure, up to and including the full extent established by the broad general meaning of the terms used in the claims.

What is claimed is:

1. A mounting apparatus for mounting a function unit and adjusting a height of the function unit, comprising:
    a mounting unit to be fixed to an external fixing portion, comprising:
        a first frame; and
        a pushing member fixed to the first frame;
    a connecting unit slidably mounted to the mounting unit and used to fix the function unit, comprising:
        a second frame; and
        a pivot pin rotatably connected to the second frame and corresponding to the pushing member;
    a first elastic member connected between the mounting unit and the connecting unit; and
    a second elastic member connected between the second frame and an end of the pivot pin;
    wherein when the connecting unit is moved along a predetermined adjusting direction, the first elastic member is elastically deformed, the pushing member drives the pivot pin to rotate and the second elastic member is elastically deformed by being driven by the pivot pin, the connecting unit stops at a predetermined position when restoring forces of the first elastic member and the second elastic member are balanced.

2. The mounting apparatus of claim 1, wherein the second frame defines a first fixing portion, an end of the pivot pin defines a fixing hole; the second elastic member comprises two opposing ends respectively connected to the first fixing portion and the fixing hole.

3. The mounting apparatus of claim 2, wherein the connecting unit further comprises a connecting rod comprising two opposing ends, an end of the connecting rod is connected to the second frame, the other end of the connecting rod defines a pivot portion; a middle portion of the pivot pin defines a pivot hole corresponding to the pivot portion; the pivot pin is rotatably connected to the connecting rod through the pivot hole and the pivot portion.

4. The mounting apparatus of claim 3, wherein the pivot pin comprises:
    a first end; and
    a second end opposite to the first end;
    the fixing hole is defined on the second end; the first end is corresponding to the pushing member; when the connecting unit is moved along the predetermined adjusting direction, the pushing member pushes the first end to drive the pivot pin to rotate, the second end is driven to rotate and drives the second elastic member to be elastically deformed.

5. The mounting apparatus of claim 1, wherein the first frame comprises:
    a top plate;
    a bottom plate parallel and adjacent to the top plate; and
    a side plate connected between the top plate and the bottom plate;
    wherein an end of the first elastic member is connected to the top plate, the other end of the first elastic member is connected to the second frame.

6. The mounting apparatus of claim 5, wherein the top plate comprises a fixing member; an end of the first elastic member is connected to the fixing member, the other end of the first elastic member is connected to a lower portion of the second frame.

7. The mounting apparatus of claim 6, wherein the fixing member comprises:
    a fixing pole, wherein an end of the fixing pole is connected to the top plate; and
    a second fixing portion fixed to the another end of the fixing pole;
    wherein the lower portion of the second frame defines a third fixing portion corresponding to the second fixing portion; an end of the first elastic member is connected to the second fixing portion, another end of the first elastic member is connected to the third fixing portion.

8. The mounting apparatus of claim 1, wherein the mounting apparatus comprises two first elastic members symmetrically disposed.

9. The mounting apparatus of claim 1, wherein the first frame defines a mounting hole, the mounting unit is fixed to an external fixing portion through the mounting hole.

10. An electronic device comprising:
    a function unit; and
    a mounting apparatus for mounting the function unit and adjusting a height of the function unit, comprising:
        a mounting unit to be fixed to an external fixing portion, comprising:
            a first frame; and
            a pushing member fixed to the first frame;
        a connecting unit slidably mounted to the mounting unit and used to fix the function unit, comprising:
            a second frame; and
            a pivot pin rotatably connected to the second frame and corresponding to the pushing member;
        a first elastic member connected between the mounting unit and the connecting unit; and
        a second elastic member connected between the second frame and an end of the pivot pin;
        wherein when the connecting unit is moved along a predetermined adjusting direction, the first elastic member is elastically deformed, the pushing member drives the pivot pin to rotate and the second elastic member is elastically deformed by being driven by the pivot pin, the connecting unit stops at a predetermined position when restoring forces of the first elastic member and the second elastic member are balanced.

11. The electronic device of claim 10, wherein the second frame defines a first fixing portion, an end of the pivot pin defines a fixing hole; the second elastic member comprises two opposing ends respectively connected to the first fixing portion and the fixing hole.

12. The electronic device of claim 11, wherein the connecting unit further comprises a connecting rod comprising two opposing ends, an end of the connecting rod is connected to the second frame, the other end of the connecting rod defines a pivot portion; a middle portion of the pivot pin defines a pivot hole corresponding to the pivot portion; the pivot pin is rotatably connected to the connecting rod through the pivot hole and the pivot portion.

13. The electronic device of claim 12, wherein the pivot pin comprises:
a first end; and
a second end opposite to the first end;
the fixing hole is defined on the second end; the first end is corresponding to the pushing member; when the connecting unit is moved along the predetermined adjusting direction, the pushing member pushes the first end to drive the pivot pin to rotate, the second end is driven to rotate and drives the second elastic member to be elastically deformed.

14. The electronic device of claim 10, wherein the first frame comprises:
a top plate;
a bottom plate parallel and adjacent to the top plate; and
a side plate connected between the top plate and the bottom plate;
wherein an end of the first elastic member is connected to the top plate, the other end of the first elastic member is connected to the second frame.

15. The electronic device of claim 14, wherein the top plate comprises a fixing member; an end of the first elastic member is connected to the fixing member, the other end of the first elastic member is connected to a lower portion of the second frame.

16. The electronic device of claim 15, wherein the fixing member comprises:
a fixing pole, wherein an end of the fixing pole is connected to the top plate; and
a second fixing portion fixed to another end of the fixing pole;
wherein the lower portion of the second frame defines a third fixing portion corresponding to the second fixing portion; an end of the first elastic member is connected to the second fixing portion, another end of the first elastic member is connected to the third fixing portion.

17. The electronic device of claim 10, wherein the mounting apparatus comprises two first elastic members symmetrically disposed.

18. The mounting apparatus of claim 10, wherein the first frame defines a mounting hole, the mounting unit is fixed to an external fixing portion through the mounting hole.

* * * * *